United States Patent
Abdoli et al.

(10) Patent No.: US 9,100,255 B2
(45) Date of Patent: Aug. 4, 2015

(54) FRAME STRUCTURE FOR FILTER BANK MULTI-CARRIER (FBMC) WAVEFORMS

(71) Applicant: FutureWei Technologies, Inc., Plano, TX (US)

(72) Inventors: Mohammad Javad Abdoli, Kanata (CA); Ming Jia, Ottawa (CA); Jianglei Ma, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/184,078

(22) Filed: Feb. 19, 2014

(65) Prior Publication Data

US 2014/0233437 A1    Aug. 21, 2014

Related U.S. Application Data

(60) Provisional application No. 61/766,437, filed on Feb. 19, 2013.

(51) Int. Cl.
*H04W 56/00* (2009.01)
*H04L 27/26* (2006.01)

(52) U.S. Cl.
CPC .................................. *H04L 27/264* (2013.01)

(58) Field of Classification Search
CPC ... H04L 27/264; H04L 25/022; H04L 25/067; H04L 27/2631; H04L 27/2634; H04L 27/2647; H04L 27/265; H04L 27/266; H04L 27/2665; H04L 27/2672; H04L 27/2675; H04L 27/2688; H04L 27/2698; G09G 5/022
USPC .......... 370/252, 319, 336, 280; 375/260–261, 375/348, 135, 136, 364
See application file for complete search history.

(56) References Cited

U.S. PATENT DOCUMENTS

| | | | | |
|---|---|---|---|---|
| 7,505,524 | B2* | 3/2009 | Lozhkin | 375/261 |
| 7,551,548 | B2* | 6/2009 | Kasami et al. | 370/208 |
| 8,520,758 | B2* | 8/2013 | Bellanger | 375/261 |
| 8,687,720 | B2* | 4/2014 | Berg | 375/260 |
| 2004/0252772 | A1 | 12/2004 | Renfors et al. | |
| 2005/0271026 | A1* | 12/2005 | Song et al. | 370/342 |

(Continued)

OTHER PUBLICATIONS

Baltar, L., et al., "Duplexing and Multiple Access Techniques, Software Description," FP7-ICT Future Networks, Specific Targetted Research Project, PHYDYAS_006/ICT-211887/D6.1, Jan. 1, 2009, 98 pages.

*Primary Examiner* — Edan Orgad
*Assistant Examiner* — Emmanuel Maglo
(74) *Attorney, Agent, or Firm* — Slater & Matsil, L.L.P.

(57) ABSTRACT

A unified frame structure for filter bank multi-carrier (FBMC) and orthogonal frequency division multiplexed (OFDM) waveforms may allow FBMC and OFDM frames to be communicated over a common channel without significant inter-frame gaps. The unified frame structure may set an FBMC frame duration to an integer multiple of an OFDM frame element duration to enable alignment of FBMC frames and OFDM frames in the time domain. The unified frame structure may also map control channels in the FBMC and OFDM frames to common resource locations so that the respective control channels are aligned in the time and/or frequency domains. The unified frame structure may also share synchronization channels between FBMC and OFDM frames. Additionally, overhead in an FBMC time division duplexed (TDD) communications channel can be reduced by overlapping time windows appended to FBMC blocks.

20 Claims, 12 Drawing Sheets

(56) References Cited

U.S. PATENT DOCUMENTS

| | | | |
|---|---|---|---|
| 2006/0056551 A1* | 3/2006 | Lozhkin | 375/348 |
| 2006/0247928 A1* | 11/2006 | Cowdery | 704/229 |
| 2008/0259905 A1* | 10/2008 | Connors et al. | 370/350 |
| 2008/0298319 A1* | 12/2008 | Lee et al. | 370/330 |
| 2009/0213949 A1 | 8/2009 | Javaudin | |
| 2009/0318154 A1 | 12/2009 | Lee et al. | |
| 2009/0326959 A1* | 12/2009 | Herre et al. | 704/500 |
| 2010/0015923 A1* | 1/2010 | Golitschek | 455/67.7 |
| 2011/0142152 A1* | 6/2011 | Bellanger | 375/261 |
| 2011/0202337 A1* | 8/2011 | Fuchs et al. | 704/231 |
| 2012/0243625 A1* | 9/2012 | Berg | 375/260 |
| 2012/0281551 A1* | 11/2012 | Alanara | 370/252 |
| 2013/0010623 A1* | 1/2013 | Golitschek | 370/252 |
| 2013/0286959 A1* | 10/2013 | Lou et al. | 370/329 |
| 2014/0073337 A1* | 3/2014 | Hong et al. | 455/452.1 |

\* cited by examiner

FRAME STRUCTURE FOR FILTER BANK MULTI-CARRIER (FBMC) WAVEFORMS

This patent application claims priority to U.S. Provisional Application No. 61/766,437, filed on Feb. 19, 2013 and entitled "System and Method for an OFDM-OQAM Frame Structure," which is hereby incorporated by reference herein as if reproduced in its entirety.

TECHNICAL FIELD

The present invention relates to a system and method for wireless communications, and, in particular embodiments, to a system and method for frame structure for filter bank multi-carrier (FBMC) waveforms.

BACKGROUND

Orthogonal frequency division multiplexed (OFDM) waveforms are presently used to communicate over Evolved Universal Terrestrial Radio Access (E-UTRA) air interfaces in fourth generation (4G) long term evolution (LTE) networks operating under the communications protocol defined by third generation partnership project (3GPP) technical standard (TS) 36.211 (2008), which is incorporated by reference herein as if reproduced in its entirety. OFDM waveforms provide many advantages over other waveforms, including the ease of implementation using fast Fourier transform (FFT) and inverse FFT (IFFT) and robustness against multi-path fading. However, OFDM waveforms also exhibit reduced spectral efficiency due to their inclusion of cyclic-prefix (CP) and the need for frequency guard bands. As such, other waveforms may be adopted into next generation wireless communication protocols.

SUMMARY OF THE INVENTION

Technical advantages are generally achieved, by embodiments of this disclosure which describe frame structures for filter bank multi-carrier (FBMC) waveforms.

In accordance with an embodiment, a method for communicating over a radio access network is provided. In this example, the method includes communicating a filter bank multi-carrier (FBMC) frame over an air interface of a wireless network. A frame duration of the FBMC frame is an integer multiple of a duration of an orthogonal frequency division multiple access (OFDMA) frame element in an OFDMA frame. The OFDMA frame is communicated in the wireless network or in a neighboring wireless network.

In accordance with another embodiment, a wireless device is provided. In this example, the wireless device includes a processor, and a computer readable storage medium storing programming for execution by the processor. The programming includes instructions to communicate a filter bank multi-carrier (FBMC) frame over an air interface of a wireless network. A frame duration of the FBMC frame is an integer multiple of a duration of an orthogonal frequency division multiple access (OFDMA) frame element in an OFDMA frame. The OFDMA frame is communicated in the wireless network or in a neighboring wireless network.

In accordance with yet another embodiment, a method for reducing overhead in a time division duplexed (TDD) communications session of a wireless network is provided. In this example, the method includes detecting a first filter bank multi-carrier (FBMC) block over a frequency resource during a first period. The first FBMC block is communicated in a wireless transmission that includes the first FBMC block and a first time window produced from circularly convolved filtering modulation of the first FBMC block. The method further includes transmitting an output signal over the frequency resource during a second period. The output signal includes a second FBMC block and a second time window produced from circularly convolved filtering modulation of the second FBMC block. At least a portion of the second time window and a portion of the first time window are communicated over common time-frequency resources.

In accordance with yet another embodiment, another wireless device is provided. In this example, the wireless device includes a processor, and a computer readable storage medium storing programming for execution by the processor. The programming includes instructions to detect a first filter bank multi-carrier (FBMC) block over a frequency resource during a first period. The first FBMC block is communicated in a wireless transmission that includes the first FBMC block and a first time window produced from circularly convolved filtering modulation of the first FBMC block. The programming further includes instructions to transmit an output signal over the frequency resource during a second period. The output signal includes a second FBMC block and a second time window produced from circularly convolved filtering modulation of the second FBMC block. At least a portion of the second time window and a portion of the first time window are communicated over common time-frequency resources.

In accordance with yet another embodiment, another method for communicating over a radio access network is provided. In this example, the method includes communicating a filter bank multi-carrier (FBMC) frame over a wireless network, and communicating an orthogonal frequency division multiple access (OFDMA) frame over the wireless network.

In accordance with yet another embodiment, yet another wireless device is provided. In this example, the wireless device includes a processor, and a computer readable storage medium storing programming for execution by the processor. The programming includes instructions to communicate a filter bank multi-carrier (FBMC) frame over a wireless network, and to communicate an orthogonal frequency division multiple access (OFDMA) frame over the wireless network.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of embodiments of this disclosure and are not necessarily drawn to scale.

DETAILED DESCRIPTION OF ILLUSTRATIVE EMBODIMENTS

Figure 1:
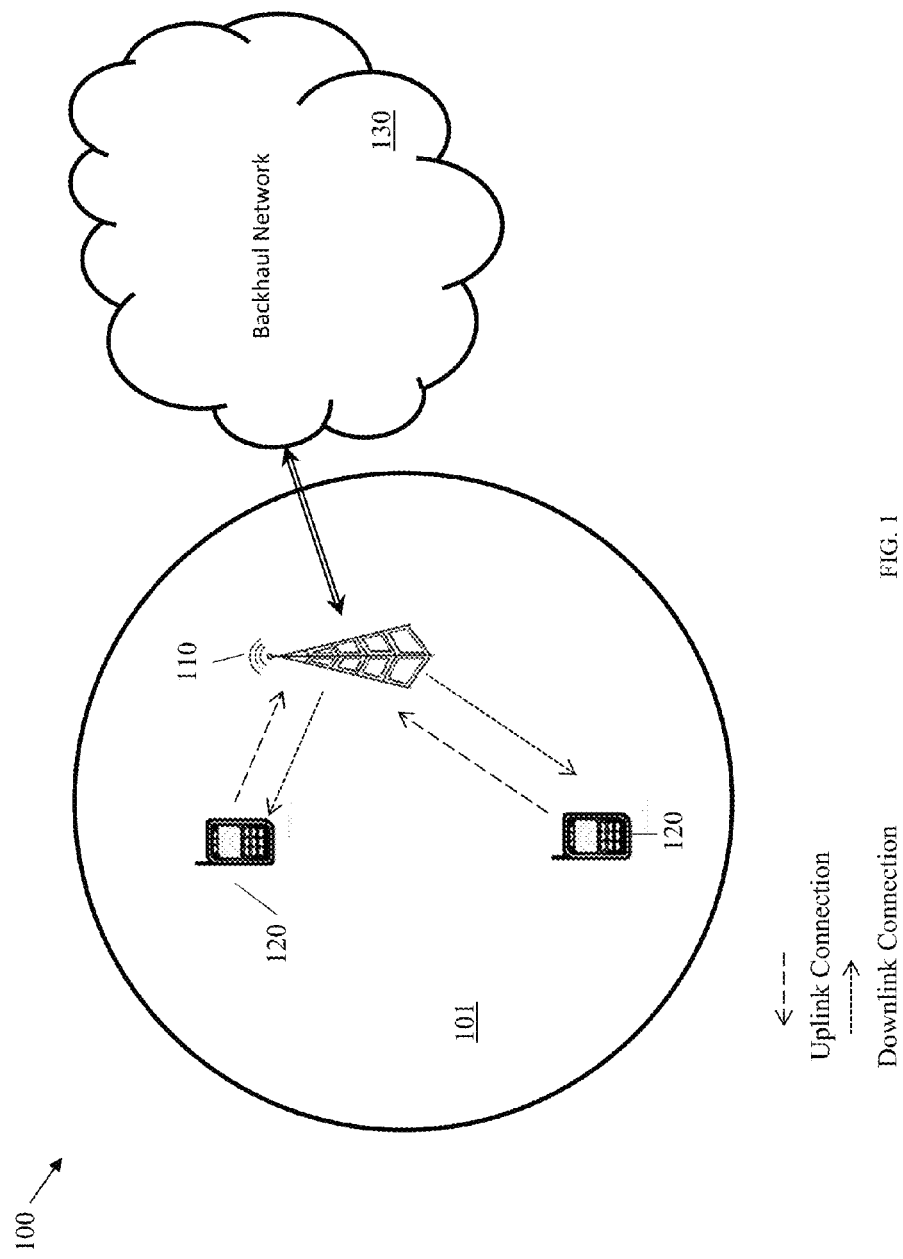
FIG. 1 illustrates a diagram of an embodiment wireless communications network.

The making and using of embodiments of this disclosure are discussed in detail below. It should be appreciated, however, that the claimed invention provides many applicable inventive concepts that can be embodied in a wide variety of specific contexts. The specific embodiments discussed are merely illustrative of specific ways to make and use the invention, and do not limit the scope of the invention.

One candidate for next generation wireless communications protocol is filter bank multicarrier (FBMC) waveforms, which are waveforms produced during OFDM-offset quadrature amplitude modulation (OQAM) transmission. FBMC waveforms offer many advantages over conventional OFDM waveforms, including lower out-of-band leakage, relaxed synchronization requirements between different transmitters, and better spectrum efficiency due to saving of the cyclic prefix (CP) and guard band. Nevertheless, OFDM waveforms may be better suited than FBMC for some user equipments (UEs), channel conditions, and/or communication setups, and consequently the next generation wireless communication protocol will likely include air interfaces that support waveform adaptation to allow the most suitable waveform (e.g., OFDM, FBMC, etc.) to be dynamically selected based on channel conditions and user equipment (UE) capabilities. As such, techniques and/or mechanisms for allowing FBMC and OFDM waveforms to coexist in the same radio access network are desired.

Aspects of this disclosure provide a unified frame structure for FBMC and OFDM waveforms so that both waveforms can be communicated over the same channel without significant inter-frame gaps. One technique for achieving a unified frame structure includes setting an FBMC frame duration to an integer multiple of an OFDM frame element duration, which may enable alignment of FBMC frames and OFDM frames in the time domain. For example, the FBMC frame may be an integer multiple of the duration of an OFDM frame, a transmission time interval (TTI) of an OFDM frame, or a slot in a TTI of an OFDM frame. Another technique for achieving a unified frame structure may include mapping control channels in the FBMC and OFDM frames to common resource locations so that the respective control channels are aligned in the time and/or frequency domains. For example, the control channel in the FBMC frame may be mapped to resource locations currently occupied by control channel elements (CCEs) and/or other control channels in an OFDM frame. Yet another technique for achieving a unified frame structure includes sharing synchronization channels between FBMC and OFDM frames. For example, the FBMC frame may utilize the same primary synchronization (PS) channel and/or second synchronization (SS) channel as the OFDM frame. Additional aspects of this disclosure provide techniques for reducing overhead in FBMC uplink and downlink frames communicated in a time division duplexed (TDD) communications channel. Overhead may be reduced by at least partially overlapping time windows appended to the uplink and downlink FBMC frame blocks. As discussed below, the time windows are a byproduct of circularly convolved filtering modulation of the data burst carried by the FBMC block, and the time windows of consecutive uplink and downlink FBMC frames can be overlapped by beginning a transmission of an FBMC TX frame before the trailing time window of the FBMC RX frame has finished propagating over the air interface. These and other aspects are described in greater detail below.

FIG. 1 illustrates a network 100 for communicating data. The network 100 comprises an access point (AP) 110 having a coverage area 101, a plurality of mobile stations 120, and a backhaul network 130. The AP 110 may comprise any component capable of providing wireless access by, inter alia, establishing uplink (dashed line) and/or downlink (dotted line) connections with the mobile stations 120, such as a base station, an enhanced base station (eNB), a femtocell, and other wirelessly enabled devices. The mobile stations 120 may comprise any component capable of establishing a wireless connection with the AP 110, such as a user equipment (UE), a station (STA), or other mobile devices. Those skilled in the art will appreciate that the term mobile device should be considered to include devices that can access so-called mobile wireless networks, even if the device is intended for use in a fixed location such a machine-to-machine device (e.g. a water or electricity meter that is not itself mobile, but makes use of a mobile wireless network for its connectivity). The backhaul network 130 may be any component or collection of components that allow data to be exchanged between the AP 110 and a remote end (not shown). In some embodiments, the network 100 may comprise various other wireless devices, such as relays, low power nodes, etc.

Figure 2:
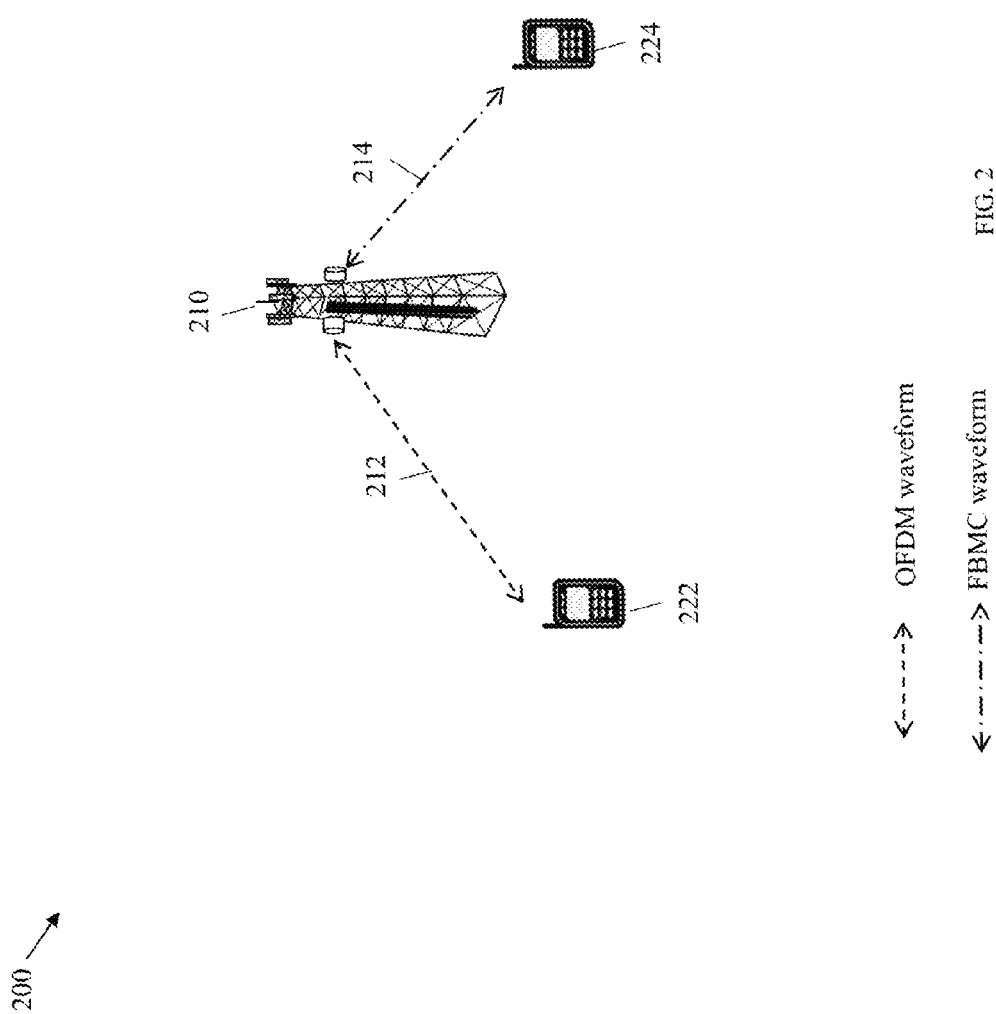
FIG. 2 illustrates a diagram of another embodiment wireless communications network.

Embodiments of this disclosure provide mechanisms for efficiently communicating OFDM and FBMC waveforms over common wireless networks, which are referred to as "hybrid wireless networks" throughout this disclosure. The ability to communicate OFDM and FBMC waveforms over hybrid wireless networks may be a desirable feature of next generation wireless communication protocols to enable waveform adaptation over the air interface. Moreover, that capability may be crucial in terms of maintaining backwards compatibility with previous standards so that legacy mobile devices can communicate seamlessly over next generation radio access networks (RANs). FIG. 2 illustrates a hybrid wireless network 200 in which different waveforms are communicated over different radio interfaces 212, 214. In this example, the mobile station 222 and the AP 210 use an OFDM waveform to communicate over the radio interface 212, while the mobile station 224 and the AP 210 use an FBMC waveform to communicate over the radio interface 214. In some embodiments, the OFDM and FBMC waveforms are selected via waveform adaptation based on the capabilities of the mobile stations 222, 224 and/or the channel conditions of the radio interfaces 212, 214 and/or other communication parameters. For example, the mobile station 222 may be a legacy mobile device (e.g., a device lacking FBMC waveform transmission/detection capability) and the mobile station 224 may be a next generation mobile device (e.g., a device capable of transmitting and/or detecting FBMC waveforms). As another example, the channel conditions of the radio interface 212 may be better suited for OFDM waveforms, while channel conditions of the radio interface 214 may be better suited for FBMC waveforms.

Figure 3:
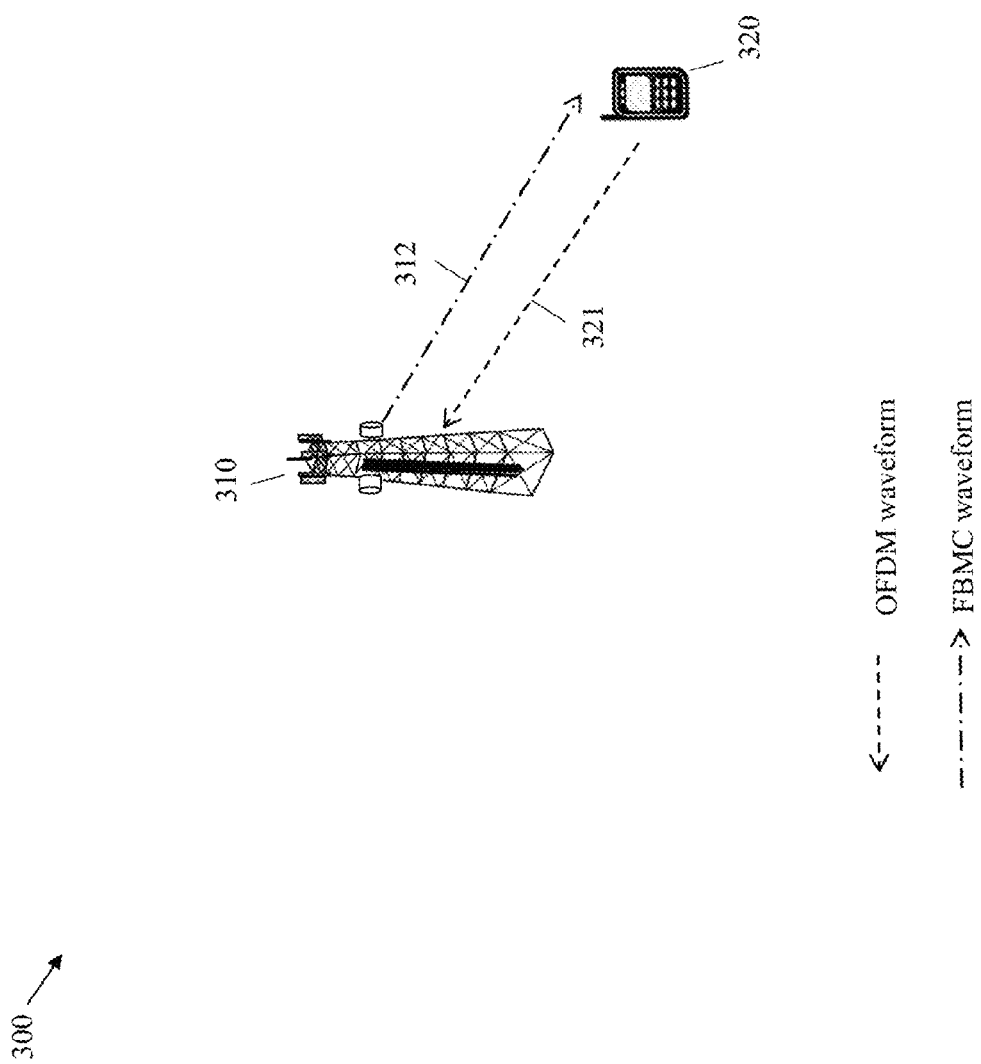
FIG. 3 illustrates a diagram of yet another embodiment wireless communications network.
Figure 4:
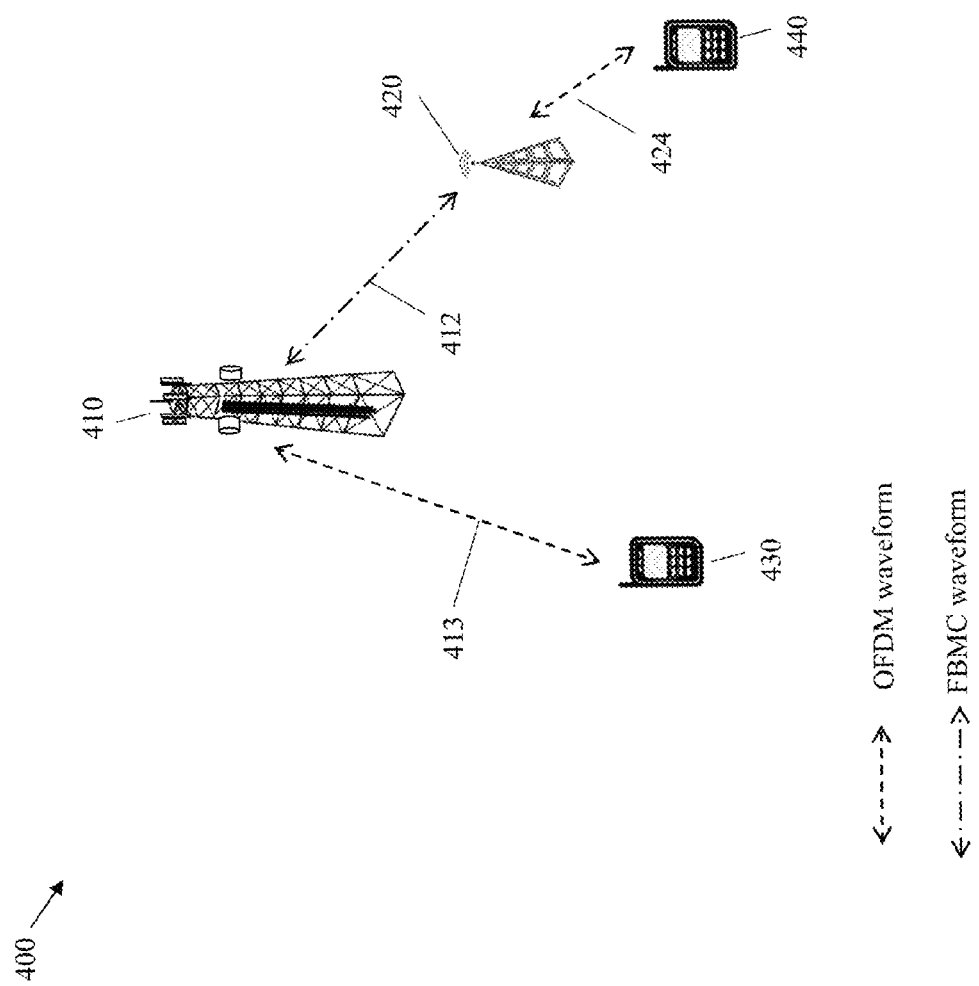
FIG. 4 illustrates a diagram of yet another embodiment wireless communications network.
Figure 5:
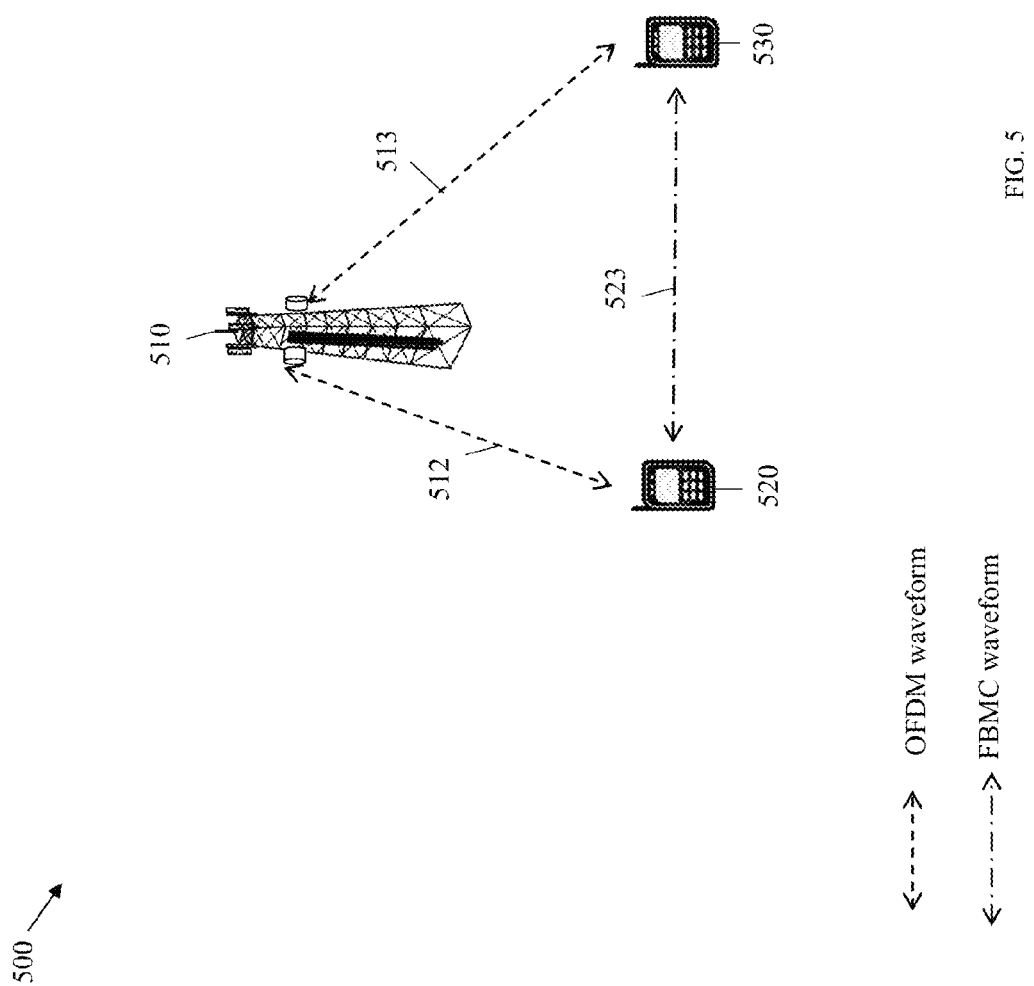
FIG. 5 illustrates a diagram of yet another embodiment wireless communications network.

In some embodiments, different waveforms are used for different types/classifications of radio interfaces. For example, different waveforms may be used for uplink and downlink cellular links. FIG. 3 illustrates a hybrid wireless network 300 in which different waveforms are communicated over downlink and uplink radio interfaces 312, 321. In this example, the mobile station 320 transmits an OFDM waveform over the uplink radio interface 321, while the AP 310 transmits an FBMC waveform over the downlink radio interface 312. As another example, different waveforms may be used for backhaul and cellular links. FIG. 4 illustrates a hybrid wireless network 400 in which different waveforms are used for backhaul and cellular radio interfaces 412, 413, 424. In this example, backhaul communications between an AP 410 and an AP 420 are carried via an FBMC waveform over a backhaul radio interface 412, while cellular communications between mobile stations 430, 440 and the APs 410, 420 are carried via an OFDM waveform over the cellular interfaces 413, 424. As yet another example, different waveforms may be used for cellular and device-to-device (D2D) links. FIG. 5 illustrates a hybrid wireless network 500 in which cellular communications between an AP 510 and mobile stations 520, 530 are carried by an OFDM waveform via cellular links 512, 513, while D2D communications between the mobile station 520 and the mobile station 530 are carried by an FBMC waveform via a D2D link 523. These are just some examples of hybrid wireless network configurations enabled by embodiment unified frame structures of this disclosure, and should not be interpreted as a delineated list of configurations for the purpose of limiting the scope of this disclosure or claims arising therefrom. For example, OFDM and FBMC waveforms may be communicated over the same radio interface.

Aspects of this disclosure provide various FBMC frame structures for use in hybrid and/or homogenous wireless networks. FBMC frames may include FBMC blocks that carry a plurality of FBMC symbols. The FBMC blocks may be generated through circularly convolved filtering modulation of a data burst as described in U.S. Non-Provisional patent application Ser. No. 14/035,161, filed on Sep. 9, 2013 and entitled "System and Method for Weighted Circularly Convolved Filtering in OFDM-OQAM," which is incorporated by reference herein as if reproduced in its entirety. As noted therein, the circularly convolved filtering modulation of the data burst may generate time windows appended to each end of the resulting FBMC block by virtue of removing the cyclic redundancy check (CRC) prefixes. The FBMC frame may include at least a portion of those time windows.

Figure 6:
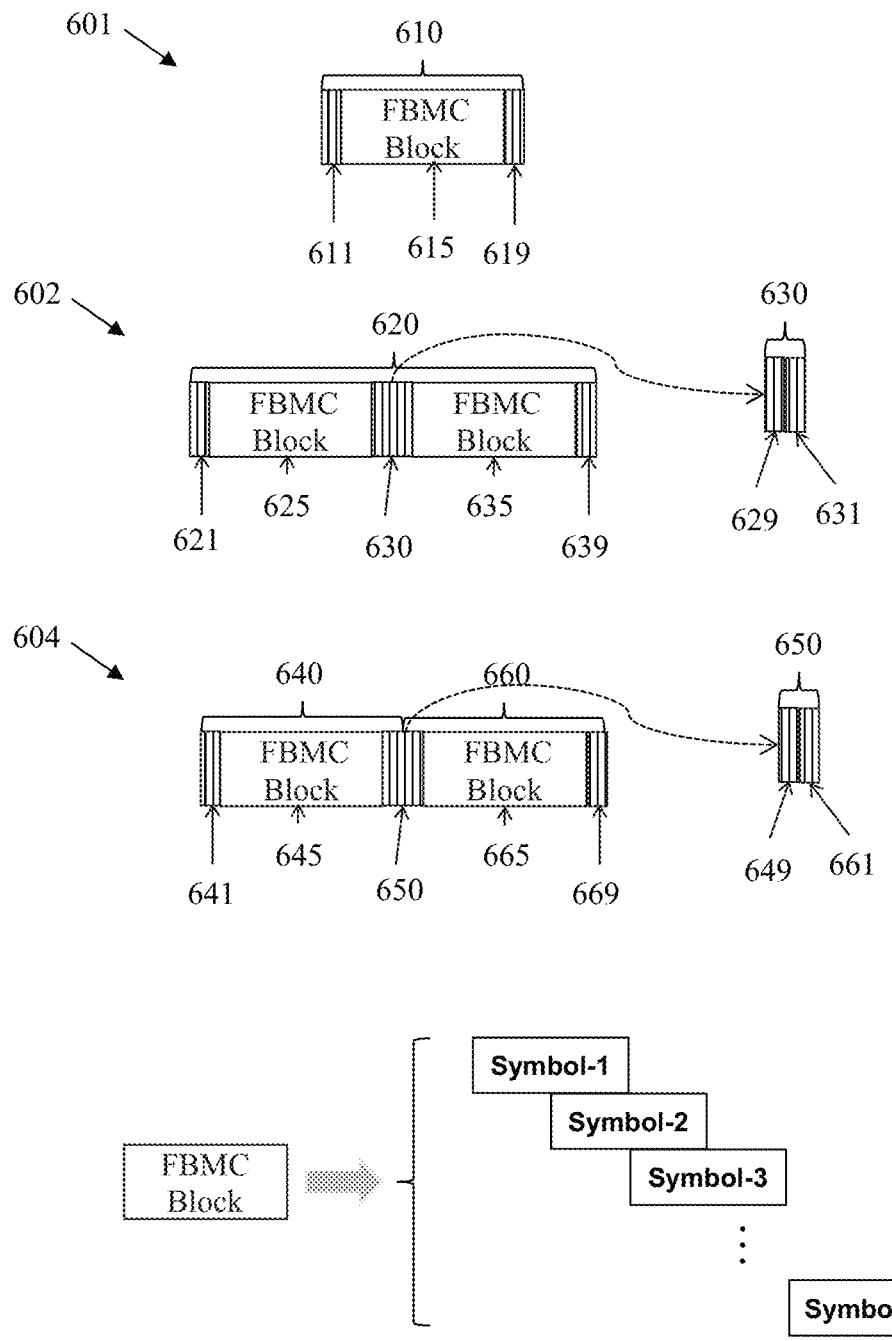
FIG. 6 illustrates diagrams of embodiment filter bank multicarrier (FBMC) frame structures.

Embodiment FBMC frame structures may include at least one FBMC block as well as portions of one or more time windows. FIG. 6 illustrates diagrams of embodiment FBMC frame structures 601, 602, 604 for FBMC frames 610, 620, and 640-650 (respectively). As shown, the FBMC frame structure 601 depicts an FBMC frame 610 that includes time windows 611, 619 appended to an FBMC block 615. The time windows 611, 619 were formed during circularly convolved filtering modulation of a data burst carried by the FBMC block 615. FBMC frame structures may include multiple blocks. The FBMC frame structure 602 depicts an FBMC frame 620 that includes an FBMC block 625 and an FBMC block 635, as well as time windows 621, 629, 631, and 639. As shown, the time windows 629, 631 are included in a time window region 630, with the time windows 621, 629 being appended to the FBMC block 625, and the time windows 631, 639 being appended to the FBMC block 635. In some embodiments, the time windows 629, 631 may at least partially overlap in the time window region 630 such that the length/duration of the time window region 630 is less than the sum of the durations of the time windows 629, 631. Alternatively, the time windows 629, 631 may be incongruous such that the length/duration of the time window region 630 is substantially equal to (or greater than) the sum of the durations of the time windows 629, 631.

In some embodiments, FBMC frames may terminate/begin in a time window region. The FBMC frame structure 604 depicts FBMC frames 640, 660 that include FBMC blocks 645, 665 (respectively) as well as time windows 641, 649, 661, and 669. As shown, the time windows 649, 661 are included in a time window region 650. In some embodiments, the time window 649 may span a frame delineation line separating the FBMC frame 640 from the FBMC frame 660, in which case a first portion of the time window 649 may be positioned in the FBMC frame 640 and a second portion of the time window 649 may be positioned in the FBMC frame 660. In the same or different embodiments, the time windows 661 may similarly span the frame delineation separating the FBMC frames 640, 660. Additionally or alternatively, the time windows 649, 661 may overlap in the time window region 650. Further, as shown in FIG. 6, an FBMC block may include staggered FBMC symbols, and the number of FBMC symbols within the block may be varied to adjust the length/duration of the FBMC block.

Figure 7:
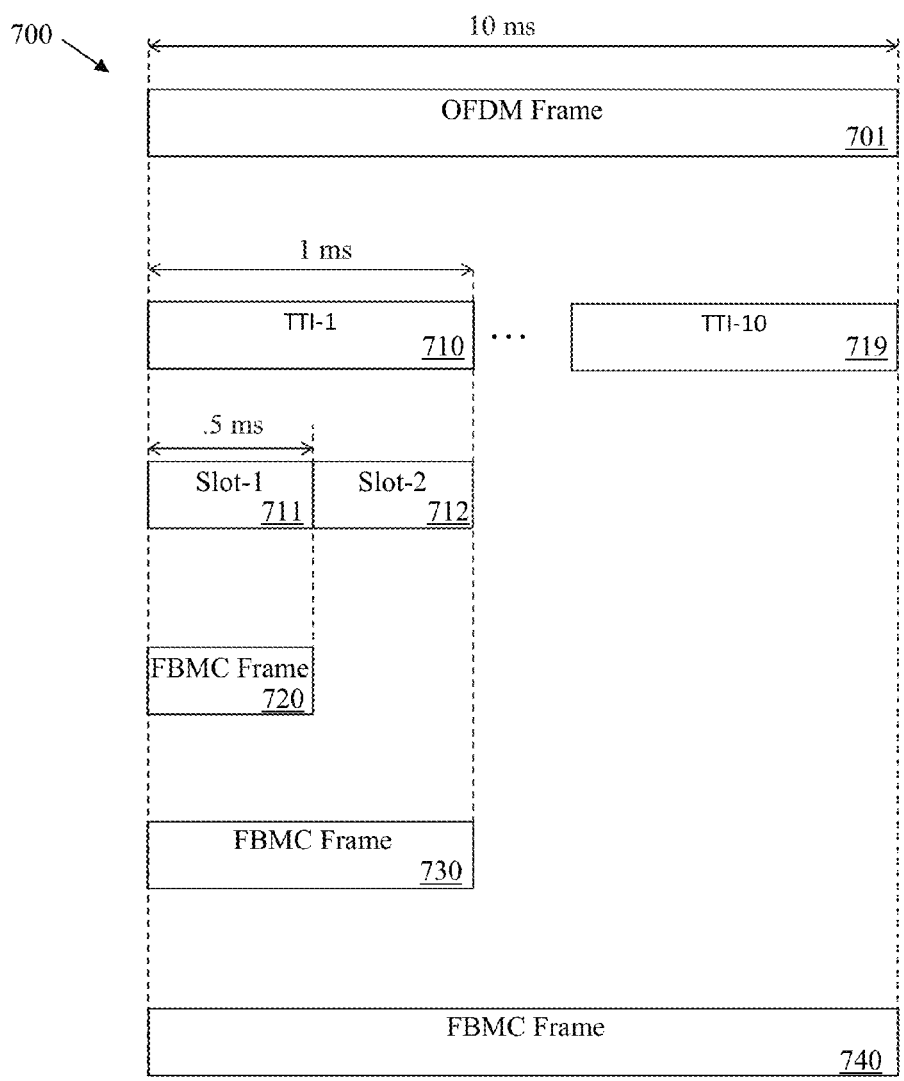
FIG. 7 illustrates diagrams of embodiment hybrid frame structures for communicating FBMC and OFDM frames in a common radio access network.

A unified frame structure can be achieved by setting an FBMC frame duration to an integer multiple of an OFDM frame element duration. FIG. 7 illustrates diagrams of embodiment hybrid frame structures 700 for communicating an OFDM frame 701 and FBMC frames 720, 730, 740 over a common radio access network. As shown, the OFDM frame 701 includes a plurality of TTIs 710-719, each of which consist of two slots. For example, the TTI 710 includes a slot 711 and a slot 712. In a unified frame structure, FBMC frames may include a duration that is an integer multiple of the duration of any OFDM frame element. In this example, the FBMC frame 720 has the same duration as the slot 711, the FBMC frame 730 has the same duration as the TTI 710, and the FBMC frame 740 has the same duration as the OFDM frame 701, with the OFDM frame 701, the TTI 710, and the slot 711 all representing OFDM frame elements. The duration of the FBMC frames 720, 730, 740 can be adjusted in several ways. For example, the duration of the FBMC frames 720, 730, 740 can be adjusted by varying the number of FBMC symbols in FBMC(s) block carried in the frame or by modifying the length of time windows appended to those blocks. For example, the total time window of an FBMC block may be around 33.3 microseconds (μs), or about one half the period of a resource element in an OFDM frame (e.g., T/2). In such case, the FBMC frame 720 may include fourteen FBMC symbols, the FBMC frame 730 may include twenty-nine FBMC symbols, and the FBMC frame 740 may include two-hundred and ninety-nine symbols. As another example, additional FBMC blocks can be added to the frame. As yet another example, the degree of overlap between time windows of adjoining frames can be modified. As yet another example, in situations where time windows span across portions of two FBMC frames, the FBMC frame boundary can be shifted. In some embodiments, the FBMC frame size can be selected dynamically. For example, the FBMC frame 720 may be used for small data bursts, and the FBMC frame 740 for large data bursts.

Figure 8:
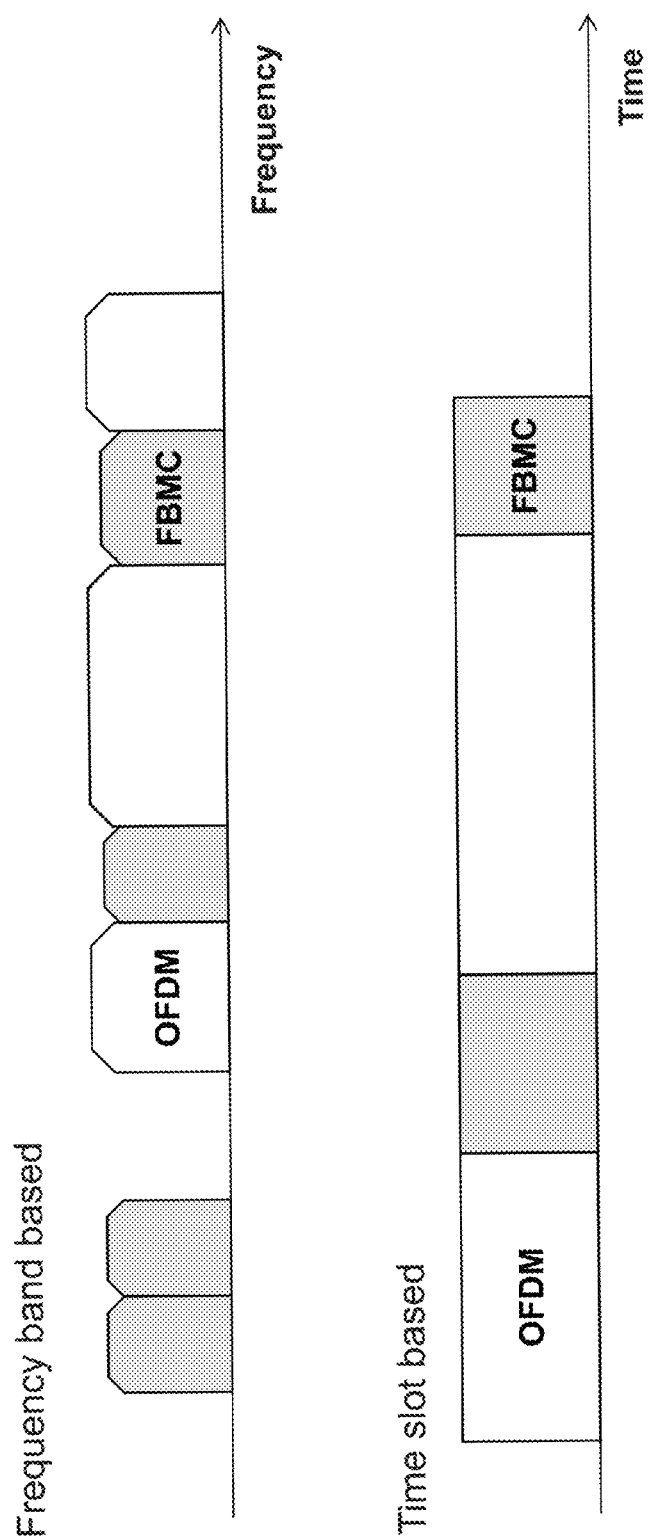
FIG. 8 illustrates diagrams of embodiment channel structures for communicating FBMC and OFDM frames in a common radio access network.

Embodiments of this disclosure allow FBMC frames and OFDM frames to be communicated in a frequency division multiplexed (FDM) or time division multiplexed (TDM) fashion, as shown by FIG. 8. When communicated in a FDM manner, OFDM waveforms may be communicated in licensed portions of the frequency spectrum, while FBMC waveforms may be communicated in unlicensed portions of the frequency spectrum. Alternatively, OFDM and FBMC waveforms may be assigned to carriers based on the out-of-band leakage requirements of the carrier or channels communicated therein. As yet another alternative, FBMC waveforms may be communicated in frequency bands/sub-bands that are not occupied by OFDM waveforms. When communicated in a TDM manner, OFDM and FBMC frames may be used based on the OOB leakage requirements of the channels being communicated.

Transmission of control and data channels consecutively in a single FBMC burst may cause the pulse shape tails to contribute to the control channel decoding delay and increase the wake-up time at the mobile device. Moreover, having different transmission modes in control and data channels combined with multiple input multiple output (MIMO) can cause inter-symbol interference (ISI) and inter-carrier interference (ICI). While weighted circular convolution removes the FBMC signal tails, it may introduce a time window, which is overhead that is much shorter than the regular FBMC tails. Additionally, time windowing may further reduce the OOB leakage.

Figure 9:
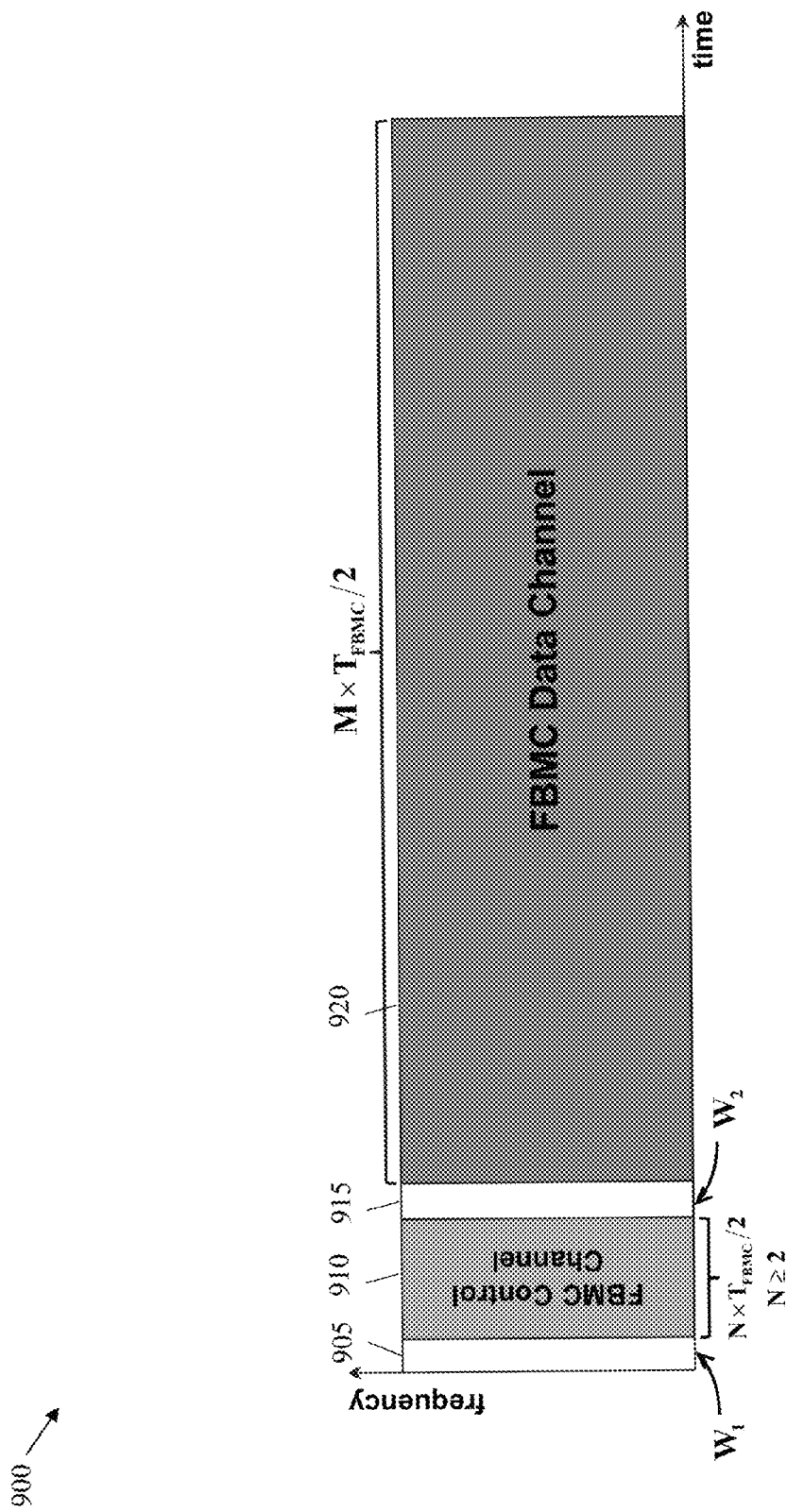
FIG. 9 illustrates a diagram of an embodiment FBMC channel structure.

Another technique for achieving a unified frame structure includes mapping control channels in the FBMC and OFDM frames to common resource locations. FIG. 9 illustrates a diagram of an embodiment FBMC channel structure 900 that includes an FBMC control channel 910, an FBMC data channel 920, and time window regions 905, 915. The FBMC control channel 910 may include an FBMC block carrying FBMC symbols that communicate control information (e.g., scheduling assignments, etc.), while the FBMC data channel 920 may include an FBMC block carrying FBMC symbols that communicate data. The time window region 905 may have a length of $W_1$, and may include at least a portion of a time window formed during modulation of the FBMC block carried by the FBMC control channel 910, as well as (potentially) a portion of a time window formed during modulation of an FBMC block carried by an adjoining frame. The time window region 915 may have a length of $W_2$, and may include time windows formed during modulation of FBMC blocks carried by the FBMC control channel 910 and the FBMC data channel 920. The control and data symbols may be independently modulated and transmitted using circularly convolved FBMC blocks. In some embodiments, $W_2$ also includes the channel's delay spread in addition to the time windows. In some embodiments, it may be possible to achieve alignment with OFDM frame elements if the following equation is satisfied: $W_1+W_2+(M+N)\times T_{FBMC}/2=T_{OFDM\text{-}TTI}$. For example, symbol level alignment may be achieved when M=27, N=2, $W_1=W_2=16.7$ μs, and $T_{FBMC}=T_{OFDM}$. Additionally, the FBMC and OFDM frames may share the same synchronization channels and/or the same sampling frequency.

In some embodiments, the FBMC control channel is mapped to resource locations within the FBMC frame that align with control channel elements (CCEs) in an OFDMA frame. For example, the FBMC control channel and the physical downlink control channel (PDCCH) may occupy the same resource location in the respective FBMC and OFDM frames. The FBMC control channel may be excluded from resource locations within the FBMC frame that align with resource elements (REs) of an OFDM frame used to carry data. For example, the FBMC control channel may be excluded from resource element locations used to carry the physical downlink shared channel (PDSCH) and/or physical uplink shared channel (PUSCH) of an OFDM frame.

Figure 10:
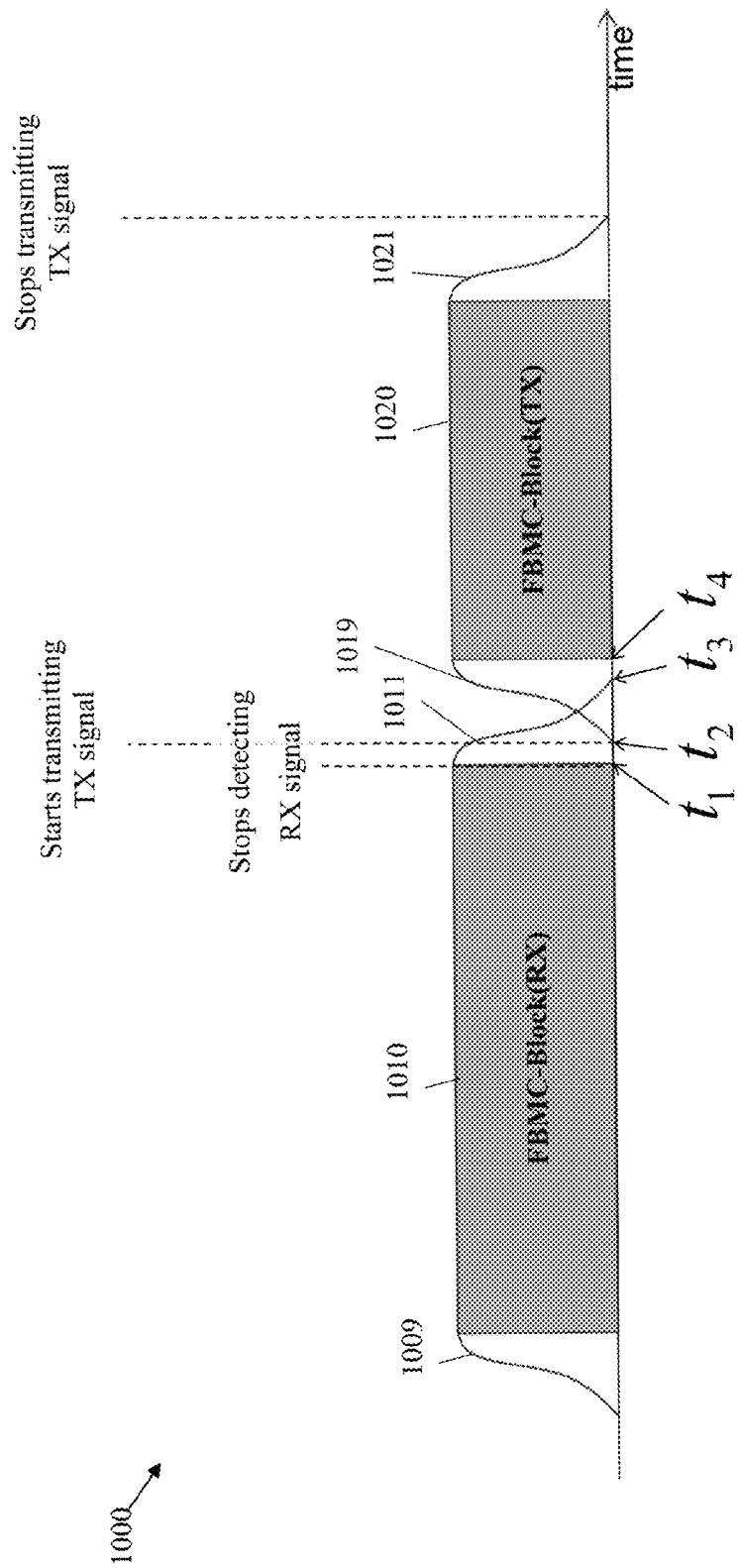
FIG. 10 illustrates a diagram of an embodiment time division duplexed (TDD) channel structure for communicating FBMC signals.

Aspects of this disclosure provide techniques for efficiently communicating FBMC signals in a time division duplexed (TDD) channel. FIG. 10 illustrates a diagram of an embodiment time division duplexed (TDD) channel structure 1000 for communicating an FBMC transmission (TX) signal and an FBMC receive (RX) signal. The FBMC RX signal includes a leading time window 1009, an FBMC block 1010, and a trailing time window 1011, while the FBMC TX signal includes a leading time window 1019, an FBMC block 1020, and a trailing time window 1021. The wireless device begins detecting the FBMC RX signal sometime prior to (or simultaneously with) the FBMC block 1010 propagating over the wireless device's radio interface (e.g., antenna). The wireless device stops detecting the FBMC RX signal at or around a first time instance ($t_1$), and thereafter proceeds to begin transmitting the FBMC TX signal at or around a second time instance ($t_2$). More specifically, the wireless device begins transmitting the leading time window 1019 at $t_2$, and begins transmitting the FBMC block 1020 at a fourth time instance ($t_4$). Notably, the trailing time window 1011 finishes propagating over the wireless device's radio interface at a third time interval ($t_3$), thereby causing the trailing time window 1011 and the leading time window 1019 to overlap. The degree to which the trailing time window 1011 and the leading time window 1019 overlap may depend on various factors. For example, a difference between $t_1$ and $t_2$ may be greater than or equal to an RX-to-TX switching time of the wireless device (e.g., around twenty micro seconds (μs) for mobile stations). As another example, if the wireless device is a mobile station communicating with a base station, then the difference between $t_3$ and $t_4$ may be greater than or equal to a propagation delay between the base station and a neighboring base station to avoid inter-cell interference caused by the FBMC TX signal. Time window overhead reduction can also be achieved through exploiting guard time between downlink and uplink transmissions.

Figure 11:
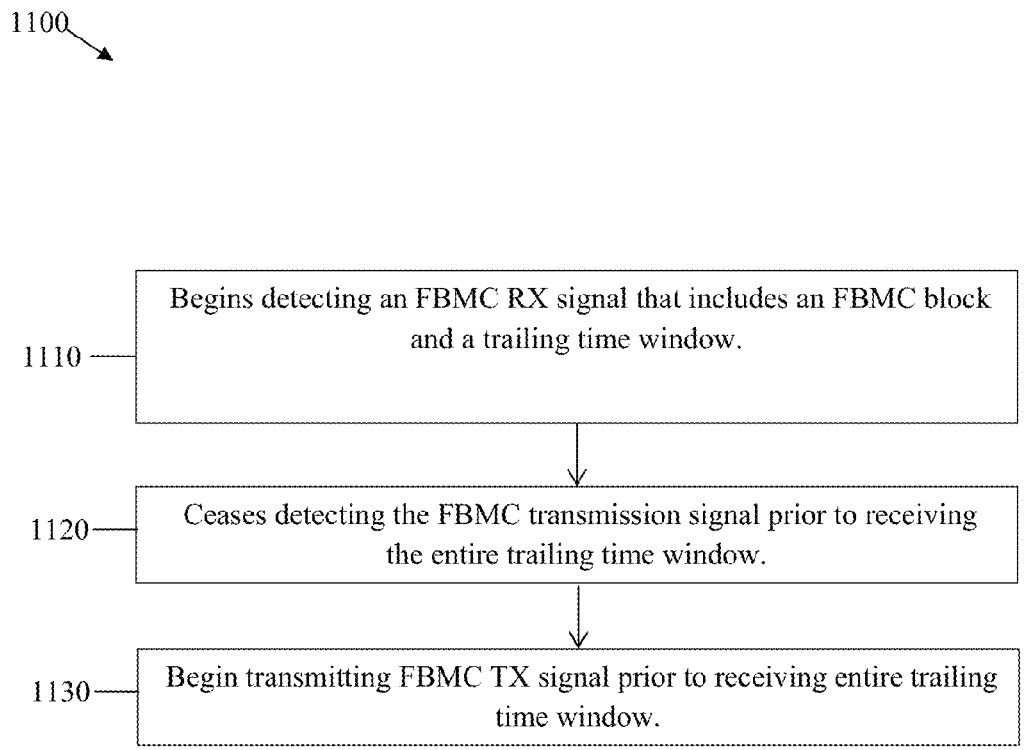
FIG. 11 illustrates a flowchart of an embodiment method for communicating FBMC signals in a TDD channel.

FIG. 11 illustrates a flowchart of an embodiment method 1100 for communicating FBMC signals in a TDD environment. As shown, the method 1100 begins with step 1110, where the wireless device begins detecting an FBMC RX signal that includes an FBMC block and a trailing time window. Thereafter, the method 1100 proceeds to step 1120, where the wireless device ceases detecting the FBMC transmission signal prior to receiving the entire trailing time window. Thereafter, the method 1100 proceeds to step 1130, where the wireless device begins transmitting an FBMC TX signal prior to receiving the entire trailing time window. As a result, a leading time window of the FBMC TX signal may overlap with the trailing time window of the FBMC RX signal.

An embodiment provides an OFDMA-backward compatible frame structure for FBMC. An embodiment provides a unified frame structure for FBMC and OFDMA. The unified frame structure simplifies the time synchronization of a system with mixed waveforms. The unified frame structure enables more flexible spectrum sharing between OFDMA and FBMC. An embodiment provides an FBMC frame structure with a time window period for each data burst. An embodiment unified frame structure provides the same sampling frequency for OFDMA and FBMC. An embodiment circular convolution filter removes the burst transition time needed in a convolution filter. An embodiment provides more flexibility to an FBMC frame structure. An embodiment provides multi-level time alignment. This includes support for different data burst sizes. An embodiment meets different out-of-band (OOB) leakage requirements. An embodiment introduces an additional time window to further reduce the OOB leakage. An embodiment provides a spectrum efficiency improvement. An embodiment may be used for large data packet transmission with a loose latency requirement. An embodiment provides additional FBMC symbols for a larger FBMC block due to more savings from CP removal. An embodiment hybrid FBMC and OFDMA system shares the same synchronization channel for timing and frequency synchronization, such as one based on an LTE synchronization channel.

An OFDMA frame (10 ms) may contain ten 1 ms transmission time intervals (TTIs). Each TTI can be formed by fourteen OFDM symbols (with cyclic prefix). The useful symbol time is $T_u \approx 66.7$ μs. For the normal mode, the first symbol has a cyclic prefix of length $T_{cp} \approx 5.2$ μs. The remaining six symbols have a cyclic prefix of length $T_{cp} \approx 4.7$ μs. An embodiment uses a same slot duration definition as OFDMA. Each slot contains one FBMC block. Each FBMC block is formed by fourteen FBMC symbols plus a time window. An embodiment uses a weighted circularly convolved filter. An embodiment uses the same TTI duration definition as OFDMA. Each TTI contains one FBMC block. Each FBMC block is formed by 29 FBMC symbols plus a time window. An embodiment uses a weighted circularly convolved filter. A time window can further reduce the OOB leakage. An embodiment uses the same frame duration definition for FBMC and OFDMA frames. Each frame contains one FBMC block. Each FBMC block is formed by 299 FBMC symbols plus a time window. An embodiment uses a weighted circularly convolved filter. The time window can further reduce the OOB leakage.

An embodiment provides a hybrid OFDMA and FBMC system, where OFDMA and FBMC are supported in the same network. The network can decide the frequency band, time slot or access link for OFDMA and FBMC.

With frequency division multiplexing (FDM), OFDMA and FBMC transmit over different frequency bands. Different types of spectrum (for example, licensed spectrum for OFDMA and unlicensed spectrum for FBMC) may be used. Different carriers with different OOB leakage restriction requirements may be used. FBMC transmits over the frequency band not occupied by OFDMA transmission. With time division multiplexing (TDM), different frames are used, depending on the OOB leakage restriction requirement. With different access links, FBMC uses a device-to-device (D2D) link or a back haul link, and OFDMA uses a cellular access link.

Figure 12:
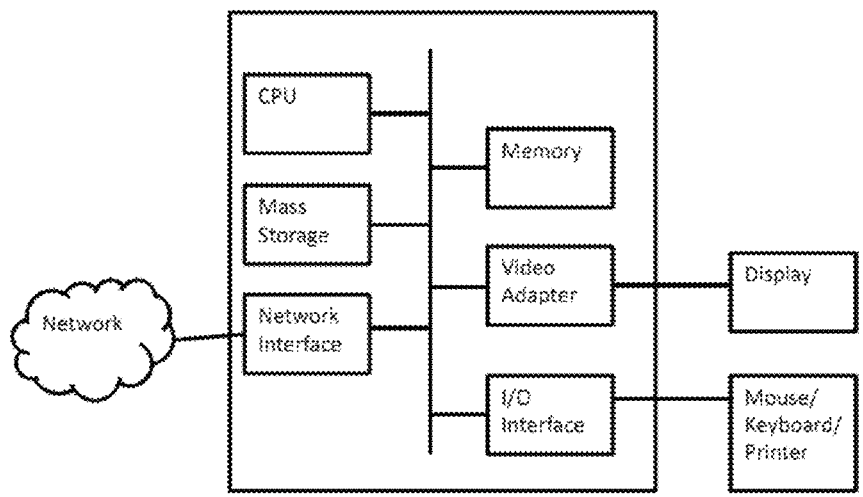
FIG. 12 illustrates a diagram of an embodiment computing platform.

FIG. 12 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer. It will be understood by those skilled in the art that many implementations of the above described embodiments will not require the presence of a video or direct I/O interface. The absence of such interfaces should not be seen as an unintended implementation, as a video adapter and I/O interface are purely optional components.

The processing unit also includes one or more network interfaces, which may comprise wired links, such as an Ethernet cable or the like, and/or wireless links to access nodes different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 13:
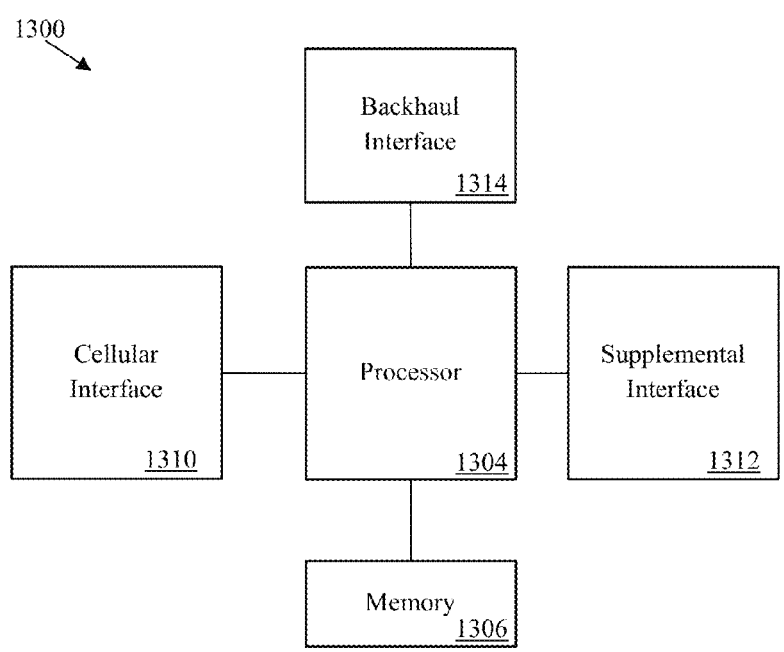
FIG. 13 illustrates a diagram of an embodiment communications device.

FIG. 13 illustrates a block diagram of an embodiment of a communications device 1300, which may be equivalent to one or more devices (e.g., UEs, NBs, etc.) discussed above. The communications device 1300 may include a processor 1304, a memory 1306, a cellular interface 1310, a supplemental interface 1312, and a backhaul interface 1314, which may (or may not) be arranged as shown in FIG. 13. The processor 1304 may be any component capable of performing computations and/or other processing related tasks, and the memory 1306 may be any component capable of storing programming and/or instructions for the processor 1304. The cellular interface 1310 may be any component or collection of components that allows the communications device 1300 to communicate using a cellular signal, and may be used to receive and/or transmit information over a cellular connection of a cellular network. The supplemental interface 1312 may be any component or collection of components that allows the communications device 1300 to communicate data or control information via a supplemental protocol, and should be considered as optional in various embodiments. For instance, the supplemental interface 1312 may be a non-cellular wireless interface for communicating in accordance with a Wi-Fi (IEEE 802.11 compliant interface) or Bluetooth protocol. Alternatively, the supplemental interface 1312 may be a wireline interface. The backhaul interface 1314 may be optionally included in the communications device 1300, and may comprise any component or collection of components that allows the communications device 1300 to communicate with another device via a backhaul network.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for communicating, the method comprising:
communicating, by a wireless device, a filter bank multi-carrier (FBMC) frame over an air interface of a wireless network, wherein a frame duration of the FBMC frame is an integer multiple of a duration of an orthogonal frequency division multiple access (OFDMA) frame element in an OFDMA frame communicated in the wireless network or in a neighboring wireless network, wherein the OFDMA frame element includes the OFDMA frame, a transmission time interval (TTI) of the OFDMA frame, or a slot in the TTI of the OFDMA frame, and wherein the FBMC frame includes a portion of a time window produced from circularly convolved filtering modulation of an FBMC block carried by an adjoining FBMC frame, the adjoining FBMC frame being communicated consecutively with the FBMC frame in the time domain.

2. The method of claim 1, wherein the OFDMA frame element comprises the OFDMA frame.

3. The method of claim 1, wherein the OFDMA frame element comprises the TTI of the OFDMA frame.

4. The method of claim 1, wherein the OFDMA frame element comprises the slot in the TTI of the OFDMA frame.

5. The method of claim 1, wherein the FBMC frame includes one or more FBMC blocks, and wherein each of the one or more FBMC blocks include a plurality of FBMC symbols.

6. The method of claim 1, wherein the FBMC frame includes an FBMC block and at least a portion of a time window produced from circularly convolved filtering modulation of the FBMC block.

7. The method of claim 1, wherein the FBMC frame includes a control channel, the control channel being mapped to resource locations within the FBMC frame that align with control channels in the OFDMA frame.

8. The method of claim 7, wherein the control channel is excluded from resource locations within the FBMC frame that align with resource elements (REs) of a physical downlink shared channel (PDSCH) in the OFDMA frame.

9. A wireless device comprising:
a processor; and
a non-transitory computer readable storage medium storing programming for execution by the processor, the programming including instructions to:
communicate a filter bank multi-carrier (FBMC) frame over an air interface of a wireless network, wherein a frame duration of the FBMC frame is an integer multiple of a duration of an orthogonal frequency division multiple access (OFDMA) frame element in an OFDMA frame communicated in the wireless network or in a neighboring wireless network, and wherein the OFDMA frame element includes the OFDMA frame, a transmission time interval (TTI) of the OFDMA frame, or a slot in the TTI of the OFDMA frame, and wherein the FBMC frame includes a portion of a time window produced from circularly convolved filtering modulation of an FBMC block carried by an adjoining FBMC frame, the adjoining FBMC frame being communicated consequently with the FBMC frame in the time domain.

10. A method for reducing overhead in a time division duplexed (TDD) communications session of a wireless network, the method comprising:
detecting, by a wireless transceiver, a first filter bank multi-carrier (FBMC) block over a frequency resource during a first period, the first FBMC block being communicated in a wireless transmission that includes the first FBMC block and a first time window produced from circularly convolved filtering modulation of the first FBMC block; and
transmitting, by the wireless transceiver, an output signal over the frequency resource during a second period, wherein the output signal includes a second FBMC block and a second time window produced from circularly convolved filtering modulation of the second FBMC block, and wherein the second time window produced from circularly convolved filtering modulation of the second FBMC block partially overlaps the first time window produced from circularly convolved filtering modulation of the first FBMC block such that at least a portion of the second time window and a portion of the first time window are communicated over common time-frequency resources.

11. The method of claim 10, wherein the first period is non-contiguous with the second period.

12. The method of claim 10, wherein the wireless transceiver is a mobile station in the wireless network.

13. The method of claim 10, wherein the wireless transceiver is an access point (AP) in the wireless network.

14. The method of claim 10, wherein the first period precedes the second period in the time domain.

15. The method of claim 10, wherein the second period precedes the first period in the time domain.

16. The method of claim 11, wherein the first period and the second period are separated by an intermediate time interval during which time the wireless transceiver is neither detecting nor transmitting radio signals over the frequency subband.

17. The method of claim 16, wherein the intermediate interval is equal to or greater than a transmission-reception (Tx-Rx) switching time of the wireless transceiver.

18. The method of claim 16, wherein the intermediate interval is equal to or greater than a propagation time between neighboring access points (APs) in the wireless network.

19. The method of claim 17, wherein the intermediate interval is equal to or greater than a transmission-reception (Tx-Rx) switching time of a mobile device in the wireless network.

20. A wireless device comprising:
a processor; and
a non-transitory computer readable storage medium storing programming for execution by the processor, the programming including instructions to:
detect a first filter bank multi-carrier (FBMC) block over a frequency resource during a first period, the first FBMC block being communicated in a wireless transmission that includes the first FBMC block and a first time window produced from circularly convolved filtering modulation of the first FBMC block; and transmit an output signal over the frequency resource during a second period, wherein the output signal includes a second FBMC block and a second time window produced from circularly convolved filtering modulation of the second FBMC block, and wherein the second time window produced from circularly convolved filtering modulation of the second FBMC block partially overlaps the first time window produced from circularly convolved filtering modulation of the first FBMC block such that at least a portion of the second time window and a portion of the first time window are communicated over common time-frequency resources.

* * * * *